W. H. HOUT.
LIQUID GAGE.
APPLICATION FILED OCT. 31, 1913.

1,118,773.

Patented Nov. 24, 1914.

WITNESSES
E. W. Callaghan
C. E. Trainor

INVENTOR
WALTER H. HOUT
BY Munn & Co.
ATTORNEYS

UNITED STATES PATENT OFFICE.

WALTER H. HOUT, OF WARRENSBURG, MISSOURI.

LIQUID-GAGE.

1,118,773. Specification of Letters Patent. Patented Nov. 24, 1914.

Application filed October 31, 1913. Serial No. 798,480.

*To all whom it may concern:*

Be it known that I, WALTER H. HOUT, a citizen of the United States, and a resident of Warrensburg, in the county of Johnson and State of Missouri, have invented a new and useful Improvement in Liquid-Gages, of which the following is a specification.

My invention is an improvement in liquid gages, and has for its object to provide a gage of the character specified, especially adapted for use with automobiles and like vehicles, for indicating the amount of gasolene or other fuel in the tank, and wherein mechanism is provided for permitting a correct reading to be made, regardless of the shape of the tank, and of the amount of fuel in the tank, and wherein the indication is made in liquid measure, and showing the exact amount in such measure at any time instead of indicating the depth of the fuel in the tank.

Figure 1:
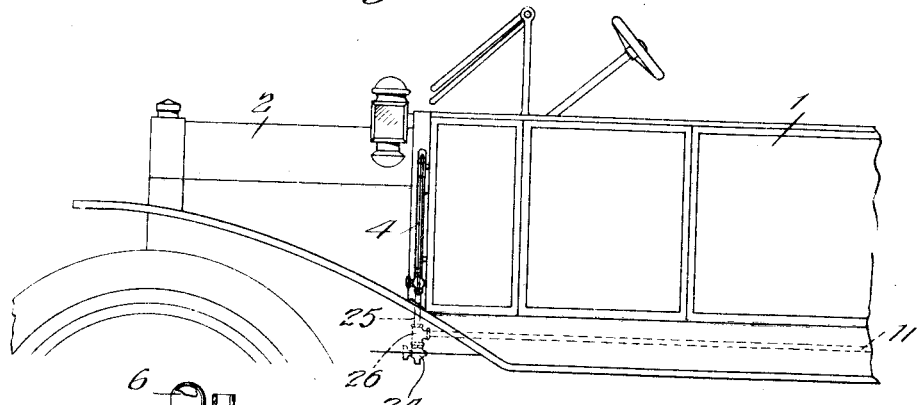
Figure 2:
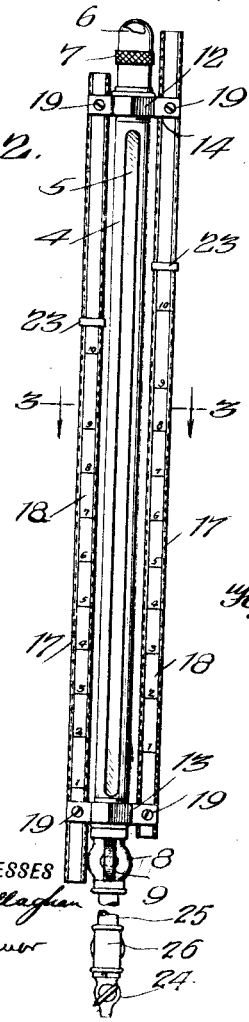
Figure 3:
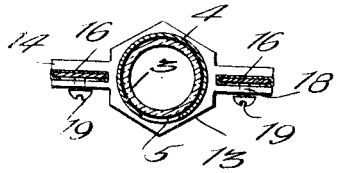
Figure 4:
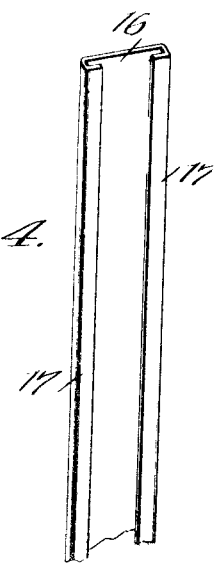
Figure 5:
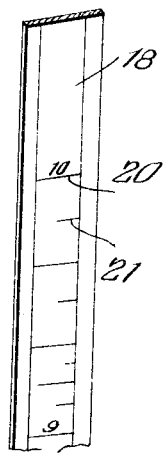

In the drawings:—Figure 1 is a partial side view of an automobile provided with the improved gage, Fig. 2 is a front view of the gage detached, Fig. 3 is a section on the line 3—3 of Fig. 2, looking in the direction of the arrows, Fig. 4 is a perspective view of a portion of the guide for the indicator, and Fig. 5 is a similar view of a part of the indicator.

The present embodiment of the invention is shown in connection with the body 1 of an automobile, and the gage is arranged alongside the said body at the hood 2, as shown in Fig. 1.

The gage proper comprises a glass tube 3, arranged within a metal case 4, the said case having a longitudinally extending opening 5, through which the gage proper may be seen, thus permitting the interested party to see the height of the fuel in the gage. The case 4 is tubular in form, and the upper end thereof is closed by a cap 6, having an annular roughened rib 7, for convenience in removing the cap, the said cap being threaded on to the top of the case, and having an air vent. The lower end of the case 4 is engaged by one end of a valve casing 8, and the valve 9 in the casing controls the inlet and outlet of the fluid to the tube 3. The lower end of the valve casing 8 is connected to a short section of pipe 25, and a T 26 is connected with the lower end of the said pipe. The pipe 11 leads from the lateral branch of the T. Near each end, the case 4 is embraced by a frame, the frame 12 being arranged at the upper end of the case, and the frame 13 at the lower end. Each of the said frames has a circular opening, and the outer surface of each of the said frames is polygonal, the said frames having a hexagonal contour in the present case.

Each of the frames 12 and 13 is provided with oppositely arranged extensions 14, and each of the said extensions is slotted as shown at 15, the slots being radial to the frame. The extensions of the upper frame register with the extensions of the lower frame, and a holder or guide, shown in Fig. 4, is supported by the extensions at each side of the case. Each of the said guides comprises a body 16, having its side edges flanged or bent over to over-lie the body in spaced relation, as indicated at 17, and an indicator 18 shown in Fig. 5, is mounted in each guide. Each of the indicators is arranged in the slots 15, of the arms at one side of the case, and screws 19 are passed transversely of the extensions and of the slots or passages 15, each screw bearing at its inner end against the front face of one of the strips 18. The guides are thus held adjustable in the extensions, so that by loosening the screws of the extensions adjacent to the guides, either guide may be moved vertically. Each of the indicators 18 is a strip of suitable material, having its side edges engaged by the over-lying flanges 17 of the guides with which it is connected.

Each of the indicators is provided with transverse graduations 20, the said graduations extending from the inner edge of one flange 17 to the inner edge of the other, and the spacing between the said indicating lines 20 is further sub-divided by lines 21 of lesser length than the lines or graduations 20. The scale upon which the graduations 20 and 21 are based, depends upon the capacity of the tank, and the space between the graduation 1, for instance, and the graduation 2 may represent a cubic capacity of one gallon in the tank. That is, when the fuel stands in the tube 3 at a point opposite the line adjacent to the numeral 1, there will be one gallon of fuel in the said tank, and in like manner, as regards the numerals 2, 3 and so on. Whatever the capacity of the tank, it will be obvious that if the graduations are spaced on the indicator to properly indicate the capacity of the tank when the said tank is level, the said graduations will not properly indicate the contents when the tank is not standing level.

Since garages are frequently built so that the cars stand on an incline, it is obvious that when in the garage, the indicator would not indicate the exact contents of the tank, the said indicator being based on the contents of the tank when the said tank was level. On this account, two indicators are provided, one for indicating the contents of the tank when the automobile stands with its wheels at the same level, and the other for indicating the contents of the tank when the automobile is not level.

It will be evident that knowing the inclination of the automobile or rather of the tank, when the automobile is standing in the garage, it will be easy to arrange one of the scales or indicators to properly indicate the contents of the tank when in such inclined position.

A marker 22 is provided for each indicator 18, the said markers being adjustable on the guideways, and being held in fixed position in any desired manner, and the said markers are designed to be placed on the scale to indicate the height of the fuel at any desired time. As for instance, on starting out on a trip, either marker may be arranged to show the height of the gasolene at the start, and by noticing the gage on the return, and noting the position of the fuel in the tube with respect to the marker, the amount of fuel used on the trip may be easily ascertained.

To place the gages, the gage is first placed in the proper position where desired, and it is connected to the fuel tank by means of a pipe or the like, the joints being made fluid tight. The car is then placed on level ground, and one of the indicating strips with its guide or holder is released, by releasing the screws 19, supporting the same. It will be understood that the indicating strips 18 are graduated in accordance with the capacity of the tank, and each strip must be graduated in accordance with the tank of the type of car with which it is to be used. After the gage has been placed, as above described, the guide which has been loosened is removed, and inserted in the tank, in order to ascertain what amount of gasolene is in the tank. Should the indicator indicate, for instance, that there is three gallons in the tank, the guide and the strip are removed, it being understood that the guide and the strip are prevented from longitudinal movement with respect to each other during this manipulation and replaced in the extensions from which the guide was removed, and indications designating the three gallons being placed exactly opposite the height of gasolene in the tube. The screws are then tightened, and that indicator so placed will always indicate the amount of gasolene in the tank, when the car is on level ground. The other gage is set in the same manner with the car on an inclined surface.

The markers 23 may be rubber bands or any other suitable device. It will be evident that such markers may be used to indicate leaks, the marker being placed when the car is run in for the night.

If there is a leak, the differences between the height of the gasolene in the tube and the mark will indicate the leak and the amount lost.

The gage when in use is an absolute protection against the entrance of water into the carbureter, and it is a known fact that perhaps 50% of engine trouble is due to such entrance of water. The water is constantly deposited in the gasolene by the sweating of the tank on the inside and unless removed, will accumulate in large quantities. Since it is heavier than the gasolene, it will travel to the lowest point and it is at this lowest point that the gage is connected. Hence the water passes from the tank and away from the carbureter into the gage, where its presence can be detected and it may be drawn off without wasting gasolene.

In addition with the gage, the operator has full control of the gasolene and may drain the tank, or withdraw any amount desired, by means of the valve 24. It will be noted that the said valve is arranged below the connection of the pipe 11, the said wire being connected with the gage between the valves 9 and 24.

A short section 25 of pipe is connected with the valve casing 8, and a T 26 is arranged between the lower end of the pipe 25 and the valve casing 24. The tank and the gage may be drained by opening the valves 9 and 24.

I claim:—

1. A gage of the character specified, comprising a tubular case having a longitudinally extending slot, a tube of transparent material within the case, a valve casing having a valve connected with the lower end of the tube and the case, a closure for the top of the tube having an air outlet, frames arranged on the case at its upper and lower ends, each of the said frames having oppositely arranged arms extending radially from the case, and the arms of the upper frame registering with the arms of the lower frame, each of the said arms having a slot radial to the tube and case, a holder comprising a plate having its side edges flanged to over-lie one face of the plate in spaced relation, an indicating strip provided with graduations in each holder, each of the said holders being arranged within the slots at one side of the case, a set screw threaded through each extension and engaging the indicating strip to hold the holder and the strip in adjusted position, said case being arranged with the slot between the holders, and a marker adjustable on each holder.

2. A gage of the character specified, comprising a tubular case having a longitudinally extending slot, a tube of transparent material within the case, a valve casing having a valve connected with the lower end of the tube and the case, a closure for the top of the tube having an air outlet, frames arranged on the case at its upper and lower ends, each of the said frames having oppositely arranged arms extending radially from the case, and the arms of the upper frame registering with the arms of the lower frame, each of the said arms having a slot radial to the tube and case, a holder comprising a plate having its side edges flanged to over-lie one face of the plate in spaced relation, an indicating strip provided with graduations in each holder, and means for detachably holding each holder and its indicating strip in the extensions.

3. A gage of the character specified, comprising a tubular case having a longitudinally extending slot, a tube of transparent material within the case, a valve casing having a valve connected with the lower end of the tube and the case, a closure for the top of the tube having an air outlet, frames arranged on the case at its upper and lower ends, each of the said frames having oppositely arranged arms extending radially from the case, and the arms of the upper frame registering with the arms of the lower frame, each of the said arms having a slot radial to the tube and case, a plurality of indicating strips provided with graduations, a holder for each strip, each holder being received in the slots of the arms at one side of the case, and releasable means for holding each holder in the extension.

4. A gage of the character specified, comprising a tubular case having a longitudinally extending slot, a tube of transparent material within the case, a valve casing having a valve connected with the lower end of the tube and the case, a closure for the top of the tube having an air outlet, frames arranged on the case at its upper and lower ends, each of the said frames having oppositely arranged arms extending radially from the case, and the arms of the upper frame registering with the arms of the lower frame, an indicating strip provided with graduations at each side of the case, and means for detachably connecting each strip and its holder to the arms at one side of the frame.

5. A gage of the character specified, comprising a tubular case having a longitudinally extending slot, a tube of transparent material within the case, a valve casing having a valve connected with the lower end of the tube and the case, a closure for the top of the tube having an air outlet, a plurality of indicating strips each provided with graduations, a holder for each strip, and means on the case for supporting the holder at opposite sides of the case and with the slot between the said strips, said holders being adjustable longitudinally of the case.

6. A gage of the character specified, comprising a tube of transparent material, a valve casing having a valve connected with the lower end of the tube, a closure for the top of the tube having an air outlet, a plurality of indicating strips each provided with graduations, a holder for each strip, and means on the tube for supporting the holder at opposite sides of the tube, said holders being adjustable longitudinally of the tube.

7. A gage of the character specified, comprising a tube of transparent material, a plurality of scales similarly graduated, a holder for each scale, and means on the tube for supporting the holders at opposite sides of the tube, said holders being adjustable longitudinally of the tube.

WALTER H. HOUT.

Witnesses:
W. E. SUDDATH,
JAS. B. MILLAR.